United States Patent
Arthurs (10) Patent No.: US 10,710,295 B2
(45) Date of Patent: Jul. 14, 2020

(54) PROTECTIVE COVERING FOR WOOD PRODUCTS

(71) Applicant: Intertape Polymer Corp., Sarasota, FL (US)

(72) Inventor: Trevor Arthurs, Truro (CA)

(73) Assignee: Intertape Polymer Corp., Sarasota, FL (US)

( * ) Notice: Subject to any disclaimer, the term of this patent is extended or adjusted under 35 U.S.C. 154(b) by 447 days.

(21) Appl. No.: 15/342,644

(22) Filed: Nov. 3, 2016

(65) Prior Publication Data
US 2017/0120503 A1 May 4, 2017

Related U.S. Application Data

(60) Provisional application No. 62/250,218, filed on Nov. 3, 2015.

(51) Int. Cl.
*B29C 63/40* (2006.01)
*B29C 63/00* (2006.01)
(Continued)

(52) U.S. Cl.
CPC .......... *B29C 63/40* (2013.01); *B29C 63/0017* (2013.01); *B29C 63/0065* (2013.01); *B32B 5/02* (2013.01); *D03D 5/00* (2013.01); *D03D 15/04* (2013.01); *D06N 3/0006* (2013.01); *D06N 3/0031* (2013.01); *B29K 2713/02* (2013.01); *B29K 2995/0049* (2013.01); *B29L 2031/7126* (2013.01); *D06N 2203/042* (2013.01); *D06N 2209/16* (2013.01); *D06N 2211/00* (2013.01); *D10B 2505/10* (2013.01); *D10B 2505/18* (2013.01)

(58) Field of Classification Search
CPC ..... D03D 15/04; B29C 63/40; B29K 2713/02
USPC .................................... 442/303; 428/192–193
See application file for complete search history.

(56) References Cited

U.S. PATENT DOCUMENTS 2,627,644 A * 2/1953 Foster ...................... D03D 9/00
156/84
4,239,831 A 12/1980 Pattenden
(Continued)

OTHER PUBLICATIONS

Arthurs, T., "Scrim Coated Products Having a Coextruded Multi-Layer Coating on One Side Thereof"; U.S. Appl. No. 15/165,692, 16 pages (dated May 26, 2016).

*Primary Examiner* — Scott W Dodds
(74) *Attorney, Agent, or Firm* — Moore & Van Allen PLLC (57) ABSTRACT

Protective coverings herein have a coated woven material with a first edge parallel with a warp direction and a second edge opposite the first edge, and have a first edge band proximate the first edge and a second edge band proximate the second edge. The coated woven material has a woven scrim made of a plurality of weft tapes and a plurality of warp tapes, but the warp tapes positioned in the first and second edge bands are high-shrinkage warp tapes and the warp tapes positioned in between the first and second edge bands have a shrinkage that is less than a shrinkage of the high-shrinkage warp tapes, and has a coating on at least one major surface of the woven scrim. The plurality of high-shrinkage warp tapes shrink upon application of heat. Methods of covering a load, such as stacked lumber, with the protective covering are also disclosed.

11 Claims, 9 Drawing Sheets

(51) Int. Cl.
*D06N 3/00* (2006.01)
*D03D 5/00* (2006.01)
*B32B 5/02* (2006.01)
*D03D 15/04* (2006.01)
*B29L 31/00* (2006.01)

(56) References Cited

U.S. PATENT DOCUMENTS

| | | | |
|---|---|---|---|
| 5,455,305 A * | 10/1995 | Galambos | D01F 6/46 |
| | | | 428/94 |
| 5,994,242 A | 11/1999 | Arthurs | |
| 6,344,250 B1 | 2/2002 | Arthurs | |
| 6,367,513 B1 | 4/2002 | Cain | |
| 6,371,292 B1 | 4/2002 | McCown et al. | |
| 7,244,507 B2 | 7/2007 | Arthurs et al. | |
| 7,947,147 B2 * | 5/2011 | Bormann | A61F 13/514 |
| | | | 156/309.6 |
| 2004/0173276 A1 * | 9/2004 | Horikawa | A44B 19/346 |
| | | | 139/384 B |
| 2005/0056335 A1 * | 3/2005 | Tielemans | D03D 1/0005 |
| | | | 139/383 A |

* cited by examiner

PROTECTIVE COVERING FOR WOOD PRODUCTS

RELATED APPLICATIONS

This application claims the benefit of U.S. Provisional Application No. 62/250,218, filed Nov. 3, 2015, the entirety of which is incorporated herein by reference.

TECHNICAL FIELD

The present application relates to protective coverings for wood products that protect loads from damage during shipment and storage, in particular to protective coverings for protecting stacked wood products that have high-shrinkable warp tapes in an edge band thereof.

BACKGROUND

Wrapping materials intended to cover goods on trucks, or the like, are well known in the art. Traditionally, such wrapping materials included tarpaulins, but these have frequently been replaced with other materials, such as polyester filament reinforced fabrics that have been coated with polyvinyl chloride. Other examples of wrapping materials in the transportation industry are lumber covers. Lumber covers tend to be specialized in their construction, being intended to wrap and protect stacks of lumber from the effects of weather during actual shipping and while the lumber sits in a yard prior to sale. A typical example of a lumber wrap is made of a woven high density polyethylene fabric that is coated on one or preferably both sides with an extrusion coating of low density polyethylene containing a particulate mineral filler e.g. as disclosed in U.S. Pat. No. 4,239,831 to T. W. E. Pattenden.

Materials for the covering of goods on trucks are important for many reasons. For instance, rain and/or sun may have adverse effects on the goods, causing staining, water damage, bleaching, rusting or a variety of other adverse effects. In addition, in cold climates, sand and/or salt may be distributed on roads to overcome problems caused by snow and ice and can cause significant damage to goods—e.g., sand blasting-type effects accompanied by salt corrosion, which result from the spray of slush, salt/sand mixtures or the like from vehicles passing along the road. In other climates, spray from the ocean may similarly cause damage to goods on the vehicle. Coverings on trucks also discourage pilfering, vandalism, or the like.

SUMMARY

In all aspects, protective coverings are disclosed that address and/or solve the problems discussed in the Background section above. The protective coverings have a coated woven material with a first edge parallel with a warp direction and a second edge opposite the first edge and having a first edge band proximate the first edge and a second edge band proximate the second edge. The coated woven material has a woven scrim having a plurality of weft tapes and a plurality of warp tapes, wherein the warp tapes positioned within the first and second edge bands are high-shrinkage warp tapes and the warp tapes in between the first and second edge bands have a shrinkage that is less than a shrinkage of the high-shrinkage warp tapes, and has a coating on at least one major surface of the woven scrim. The plurality of high-shrinkage warp tapes shrink upon application of heat.

In all aspects, the shrinkage of the warp tapes that are positioned in between the first and second edge bands is greater than a shrinkage of the plurality of weft tapes. Preferably, the plurality of weft tapes are low-shrinkage tapes and the plurality of high-shrinkage warp tapes are oriented tapes subjected to minimal or no annealing during the orienting process in order to provide high shrinkage. In one embodiment, the high-shrinkage warp tapes comprise polypropylene.

The protective covering may take a variety of different forms. In one form, the protective covering is a flat sheet of coated woven material, and a first end and a second end of the flat sheet are each folded against and secured to form wrap a load, such as a stack of lumber. In one form, the protective covering is an envelope defining an opening for receiving a load therein, such as a stack of lumber. In a third form, the protective covering is a multi-sided bag.

Regardless of which form the protective covering takes, the first edge band is juxtaposed with the first edge and the second edge band is juxtaposed with the second edge, and the first edge band and the second edge band each have a width, measured transverse to the machine direction, of about 1 in to about 8 in.

Regardless of which form the protective covering takes, the first edge band is spaced a distance apart from the first edge and the second edge band is spaced a distance apart from the second edge. Here, the first edge band is spaced a distance of about 0.5 in to about 4 in inward from the first edge and the second edge band is spaced a distance of about 0.5 in inward to about 4 in from the second edge. The first edge band and the second edge band each have a width, measured transverse to the machine direction, of about 1 in to about 8 in.

In another aspect, methods of applying any of the protective coverings disclosed herein to a load, such as a stack of lumber, are described. The methods include providing one of the various protective coverings, positioning the protective covering over the load so that the plurality of high-shrinkage warp tapes are positioned around a lower periphery of the load, and applying heat to the plurality of high-shrinkage warp tapes to cause the plurality of high shrinkage warp tapes to shrink around the stack of lumber to secure the woven sheet about the stack of lumber.

If the protective covering is a flat sheet, the method includes draping the flat sheet over the load, folding a first end and a second end of the flat sheet against the load, securing the first end and second end thereagainst. If the protective covering is an envelope defining an opening for receiving the load, the method includes sliding the envelope over the load, wherein the load is received in the opening. In another embodiment, the protective covering is a multi-sided bag.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Reference is now made in detail to the description of the embodiments as illustrated in the drawings and figures. While several embodiments are described in connection with these drawings, there is no intent to limit the disclosure to the embodiment or embodiments disclosed herein. On the contrary, the intent is to cover all alternatives, modifications, and equivalents.

Figure 1:
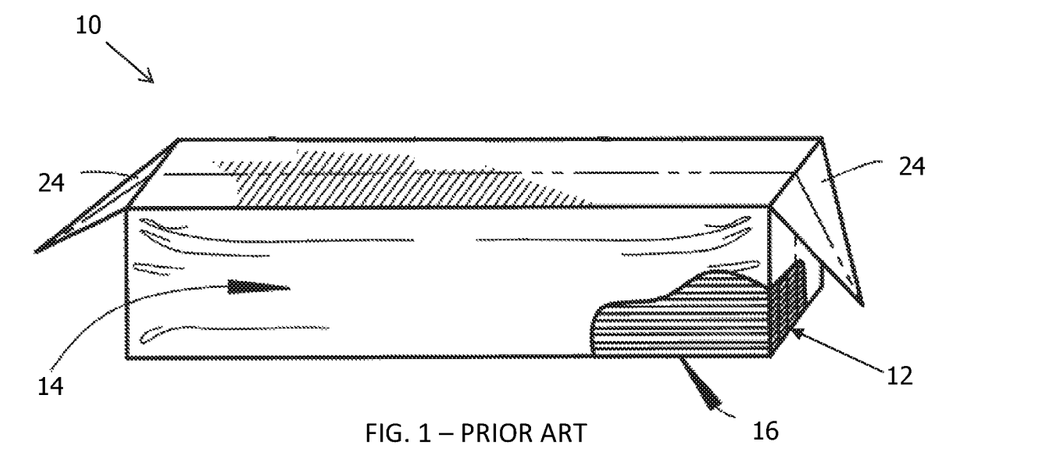
FIG. 1 is a perspective view of an initial step in a prior art method of covering a lumber stack with a protective cover.

Lumber products, such as 2×4's, 2×6's, 2×8's, plywood and other lumber products, for example, are typically arranged in stacks for transportation from a manufacturer to a customer, such as a retailer or a contractor. Referring to FIG. 1, prior to shipment, these stacks 10 of lumber products 12 are often wrapped in a plastic sheeting material 14, often including flap ends 24 from folding, to protect the lumber products 12 from exposure to weather and/or damage from pilfering, vandalism, or other cause. The plastic sheeting material 14 also provides a convenient place to identify the manufacturer.

Figure 2:
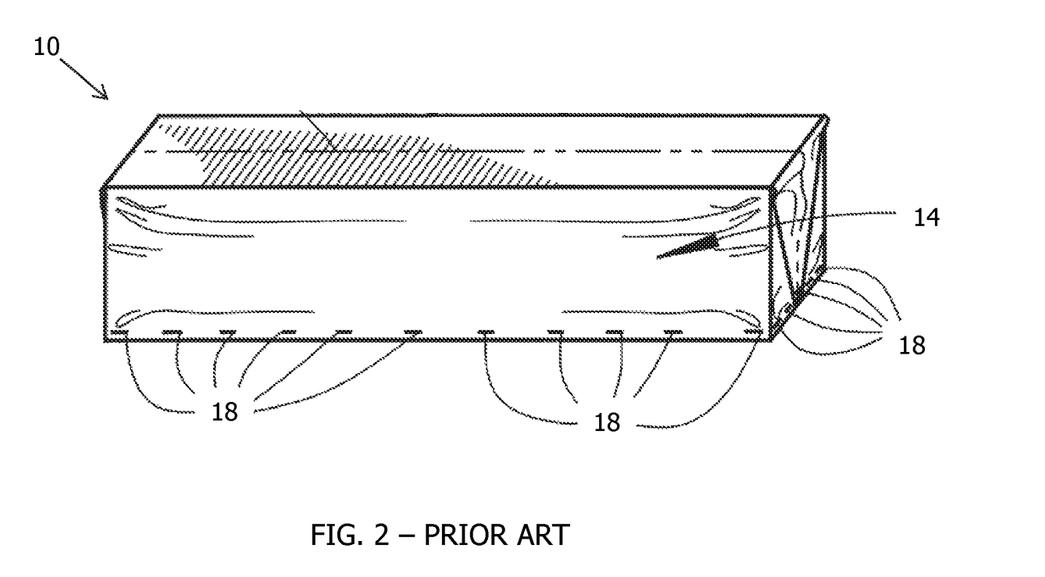
FIG. 2 is a perspective view of a prior art protective cover applied to a stack of lumber.

Referring to FIG. 2, a typical practice has been to secure the plastic sheeting 14 to the lumber stack 10 by stapling the plastic sheeting 14 to the lowermost layer 16 (shown in FIG. 1) of lumber 12 in the stack 10 at spaced apart intervals around the entire periphery of the stack 10. The use of staples 18 to secure plastic sheeting 14 to a lumber stack 10 is disadvantageous. The staples 18 can severely damage the lumber 12 into which they are inserted, and the stapling procedure is time consuming and therefore expensive. Furthermore, the staples 18 often stay in the lumber 12 after the plastic sheeting 14 has been removed. When the staples 18 stay in the lumber 12, the staples 18 often have one leg (not shown) protruding outward, which creates a cutting hazard for anyone handling the lumber 12. Staples 18 remaining in the lumber 12 can also interfere with saw blades used to cut the lumber, which can create additional safety and productivity issues.

Figure 3:
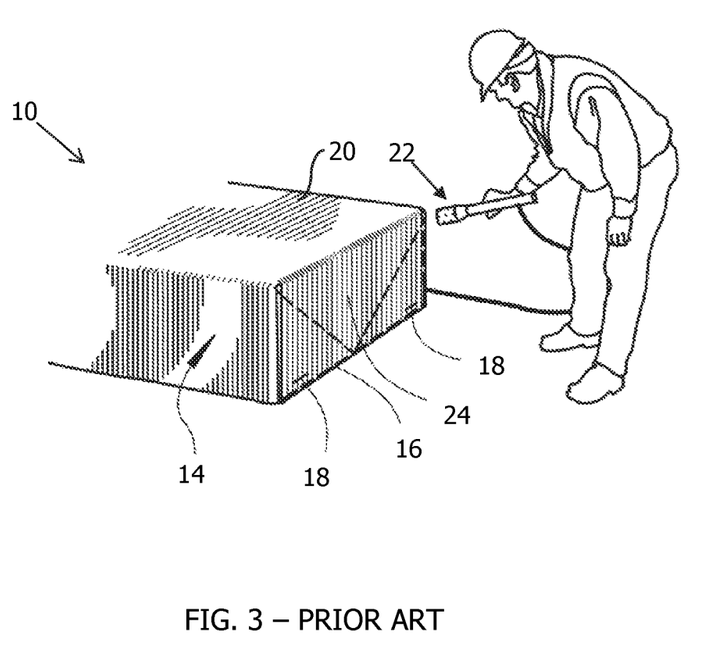
FIG. 3 is a perspective view of another prior art protective cover applied to a stack of lumber.

Attempts have been made to eliminate the need for stapling the plastic sheeting 14 around the entire periphery of the stack 10 by utilizing shrinkable plastic films, such as the shrinkwrap plastic films disclosed in U.S. Pat. No. 6,371,292. Referring to FIG. 3, the shrinkwrap material 20 is stretch-wrapped around the lumber stack 10, and heat 22 is applied to the shrinkwrap material 20 at the ends 24 of the lumber stack 10 to draw the plastic shrinkwrap material 20 tight around the lumber stack 10. These shrinkwrap film materials 20 are not robust enough to maintain the barrier properties for the required time that the lumber stack 10 needs to be protected due to very low tear propagation resistance. The shrinkwrap film materials 20 often tear through abrasion or wind whip while being transported and are, therefore, an inadequate solution.

Unlike the shrinkwrap film materials 20, coated woven fabrics are generally tough enough to survive for the required period of time, but are not suited to stretching into place in the manner of shrinkwrap film materials 20. The load required to stretch woven coated fabrics is generally too high, and the level of stretch often causes cracking of the protective coatings.

Figure 4:
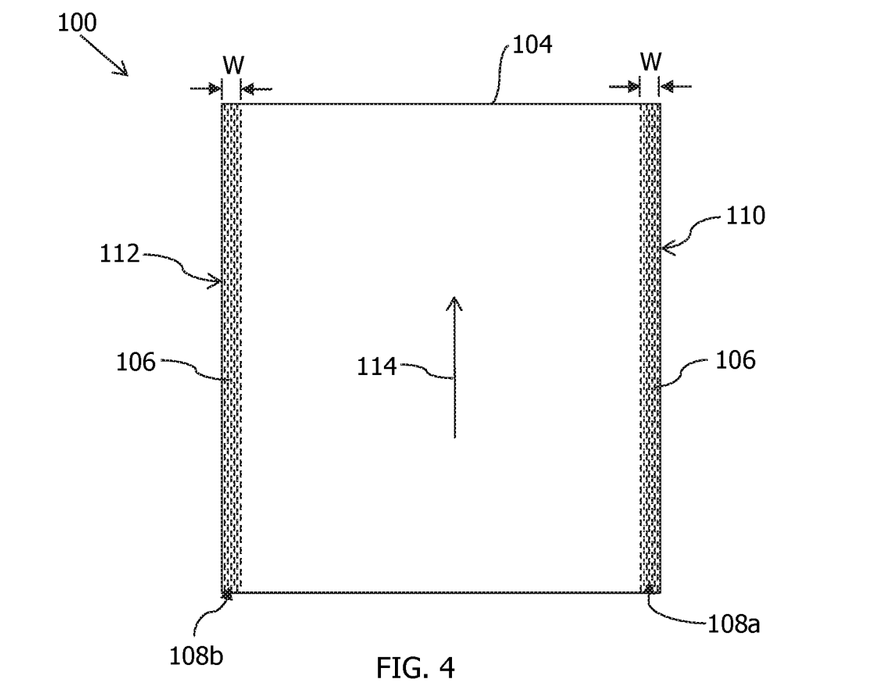
FIG. 4 is a top view of an embodiment of a protective cover disclosed herein.
Figure 5:
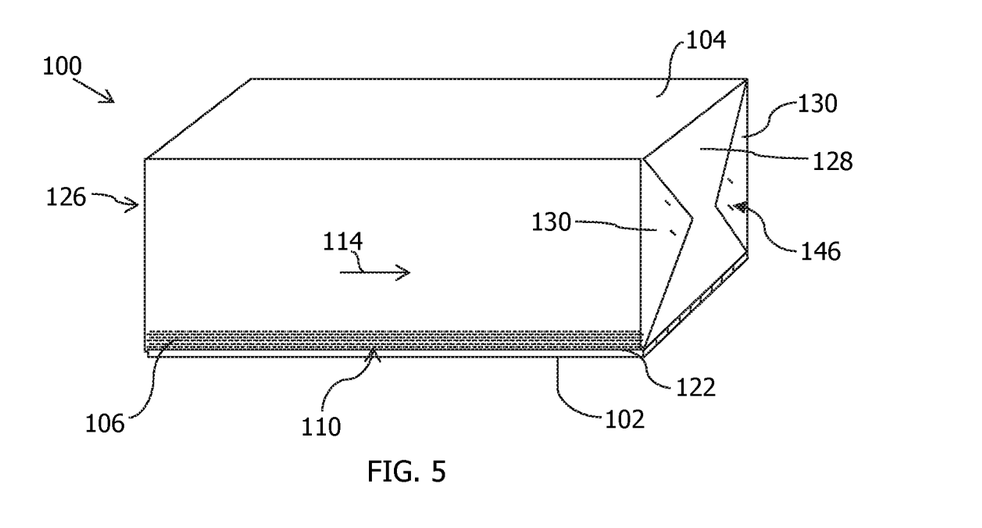
FIG. 5 is a perspective view of the protective cover of FIG. 4 applied to a load for shipment.

Referring now to FIGS. 4 and 5, a protective covering 100 for positioning over and protecting a load 102 (FIG. 5) for shipment, such as a stack of lumber products for example, is disclosed that is constructed from a coated woven material 104 having a plurality of high-shrinkage warp tapes 106 woven into the coated woven material 104 to define a first edge band 108a adjacent to a first edge 110 and a plurality of high-shrinkage warp tapes 106 woven into the coated woven material 104 to define a second edge band 108b adjacent to a second edge 112. The first edge 110 and the second edge 112 are parallel to a machine direction 114 (i.e., warp direction) and are on opposite sides of the coated woven material 104.

With reference to FIG. 4, the first edge band 108a and the second edge band 108b each have a width W. The width W may be in the range of about 1 inch to about 12 inches, more preferably about 2 inches to about 6 inches. Each of the first and second edge bands 108a, 108b may be juxtaposed to or spaced a distance apart from its respective first or second edge 110, 112. The spaced apart distance may be about 0.5 inch to about 4 inches. The positioning of the high-shrinkage warp tapes 106 is indicated by dashed lines in FIGS. 4, 5, and FIGS. 10-16, however, the high-shrinkage warp tapes 106 may not be visible through coating(s) applied to the coated woven material 104.

Referring to FIG. 5, the high-shrinkage warp tapes 106 in the first and second edge bands 108a, 108b are positioned adjacent to a lower periphery 122 of the load 102 when the protective cover 100 is fully installed on the load 102. The high-shrinkage warp tapes 106 have a shrinkage greater than a shrinkage of the coated woven material 104 generally. Once the protective cover 100 is positioned on the load 102, applying heat to the high-shrinkage warp tapes 106 causes a length of the high-shrinkage warp tapes 106 to decrease. As the lengths of the high-shrinkage warp tapes 106 decrease, the high-shrinkage warp tapes 106 constrict about the lower periphery 122 of the load 102 and exert a force thereagainst. The force exerted by the high-shrinkage warp tapes 106 against the lower periphery 122 of the load 102 is sufficient to secure the protective covering 100 to the load 102 without the need for additional securing means, such as staples or adhesives, along the length of the load. Depending on the configuration of the protective cover 100, the first and second ends 126, 128 of the protective cover 100 may have one or more staples 146 or a heat seal (not shown) to secure the ends 126, 128, in particular folded-over portions 130 thereof, against the load 102.

Figure 6:
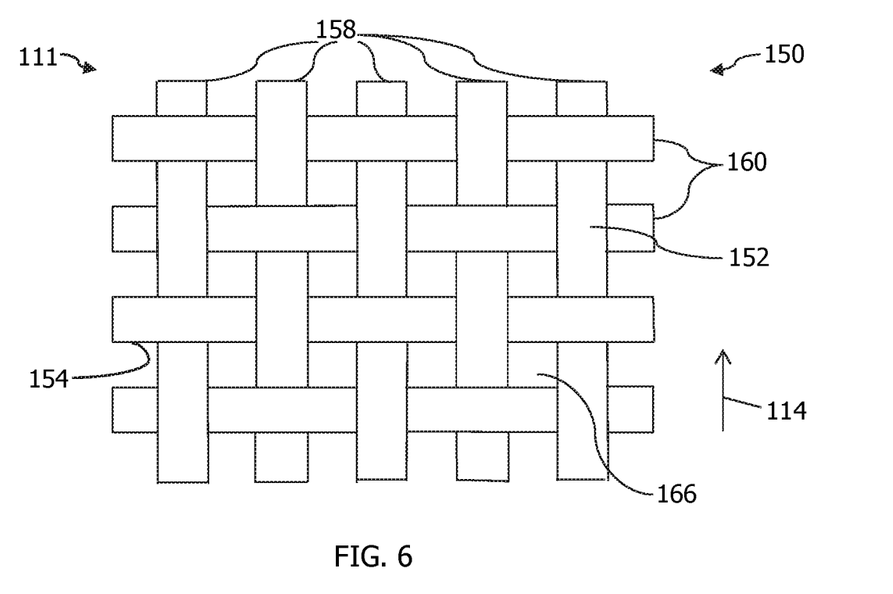
FIG. 6 is a top view of a woven scrim used to make the protective cover of FIG. 4.
Figure 7:
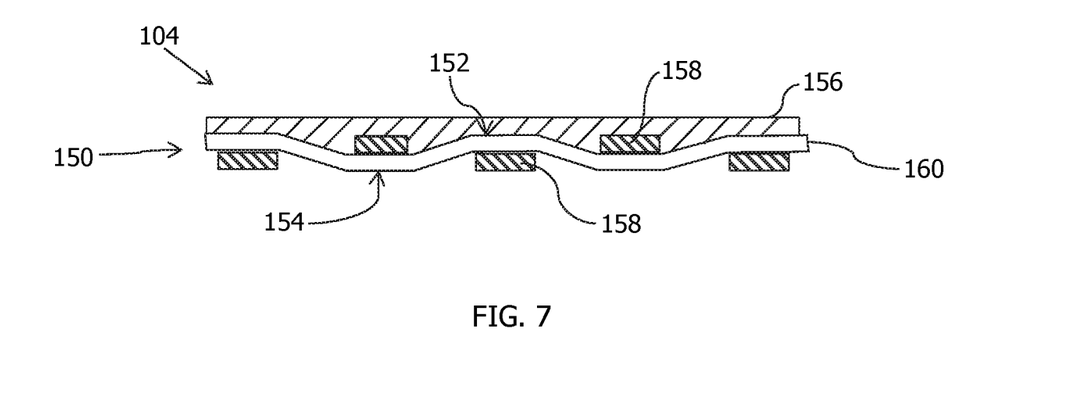
FIG. 7 is a cross-section of a coated woven material used to make the protective cover of FIG. 4.

Referring to FIGS. 6 and 7, the coated woven material 104 of FIG. 7 is formed from a layer of woven scrim 150 of FIG. 6. The woven scrim 150 has a first major surface 152, an opposing second major surface 154, and at least one coating 156, as illustrated in FIG. 7, on at least one of the first major surface 152 or the second major surface 154 of the woven scrim 150. The scrim 150 is formed from at least one of fibers, filaments, and tapes, which are woven or knitted to form the scrim. The fibers, filaments, and tapes are generally formed from polyolefin materials, examples of which include, but are not limited to, polyethylene, high density polyethylene, low density polyethylene, polypropylene, copolymers, other polyolefins, or combinations thereof. The fibers, filaments, and tapes may also be formed from other thermoplastic materials, examples of which include polyethylene terephthalate, polyesters, polyamides such as nylon, other copolymers, and combinations thereof. In one embodiment, the scrim 150 is formed from high density polyethylene tape woven or knitted to form the scrim 150. In one embodiment, the scrim 150 is formed from polypropylene tape woven or knitted to form the scrim 150. The tapes are generally flat, elongated strands of polymeric material.

FIG. 6 is a central portion 111 of the scrim 150, the portion located between the first and second edge bands 108a, 108b, that provides the majority of the tensile strength of the coated woven material 104. In this central portion 11, the scrim 150 includes a plurality of non-high shrinkage warp tapes 158 in the machine direction and a plurality of non-high shrinkage weft tapes 160 transverse to the machine direction 114. The plurality of non-high shrinkage warp tapes 158 may comprise the same material as the plurality of weft tapes 160, or may comprise a different material; however, it is preferred that these non-high shrinkage warp and weft tapes 158, 160 are oriented tapes, especially oriented tapes of polypropylene or high-density polyethylene.

As discussed above with respect to FIGS. 4 and 5, the scrim 150 also includes the plurality of high shrinkage warp tapes 106 defining the first and second edge bands 108a, 108b. The tapes 106, 158, 160 of the scrim 150 may be woven such that the scrim has a plurality of interstices 166, shown in FIG. 6, that define about 10% to about 40% of a surface area thereof, measured relative to the first major surface 152 of the scrim. In another embodiment, the interstices 166 define about 15% to about 25% of the surface area of the woven scrim 150. In another embodiment, the tapes 106, 158, 160 are tightly woven such that the interstices 166 define less than 10% of the surface area of the woven scrim 150. In one aspect, the scrim 150 has from 4 to 12 non-high shrinkage warp tapes 158 per inch in the warp direction and from 2-8 weft tapes 160 per inch in the weft direction. The coated woven material 104 can be any of the coated woven materials disclosed in co-pending U.S. application Ser. No. 15/165,692, filed on May 26, 2016, which is incorporated herein by reference in its entirety.

The plurality of non-high shrinkage warp tapes 158 may be moderate-shrinkage tapes having a shrinkage less than the high-shrinkage warp tapes 106. The moderate-shrinkage warp tapes 158 may have a shrinkage in a range of about 2% up to 6%, more preferably about 4% shrinkage at 250° F. The weft tapes 160 can have moderate to low shrinkage. In one embodiment, the weft tapes 160 are low-shrinkage tapes having a shrinkage less than the moderate-shrinkage warp tapes 158, preferably less than 5% shrinkage at 250° F.

Referring back to FIG. 4, the high-shrinkage warp tapes 106 are woven into the scrim 150 prior to applying the one or more coatings 156 (FIG. 7) thereto. The high-shrinkage warp tapes 106 may be made from a film, an oriented slit tape, or an oriented multi-filament or mono-filament tape. The high-shrinkage tapes 106 may be made from polypropylene homopolymers, high density polyethylene (HDPE), or a blend thereof, or a blend of polypropylene with LDPE and/or HDPE. The polyolefin blended with the polypropylene is present as about 1% to about 20% by weight thereof. The high-shrinkage tapes 106 can include additives, such as, but not limited to, colorants, pigments, flame retardants, and UV stabilizers.

The high-shrinkage tapes 106 are oriented tapes, preferably uni-axially oriented tapes. Typical oriented tapes can be produced by heating the tapes to a temperature above the softening temperature thereof, but below the melt temperature of the tapes and then stretching the tapes, which orients the polymers. The tapes can be oriented in the machine direction 114 (FIG. 4) and/or the transverse direction. The tapes are stretched to a length in a range of about 4 to about 9 times the original length of the tape. The tapes are thereafter cooled to set the orientation. Oriented tapes are annealed after stretching to make the tapes less brittle and easier to weave. The annealing process generally reduces the shrinkage of the tapes when exposed to heat. The high-shrinkage tapes 106 can also be produced from a unidirectionally or bi-directionally oriented film. The film can be oriented in the machine direction 114 or can be bi-directionally oriented. Following the process of orienting the polymer fibers in the film, the film can be annealed and slit into a plurality of uni-directionally or bi-directionally oriented tapes. Processes for making various oriented tapes and films are known.

To create the high-shrinkage warp tapes 106 having a shrinkage greater than the other tapes 158, 160 in the woven scrim 150, the amount of annealing to which the high-shrinkage tapes 106 are subjected is reduced or eliminated. For the resulting oriented, high-shrinkage tapes 106, applied heat relaxes the orientation in the tape, causing the tape to reduce its length or shrink relative to its original state. The high-shrinkage warp tapes 106 can have a shrinkage of at least 9% at 250° F. The shrinkage of the high-shrinkage warp tapes 106 may be in a range of greater than 6% to about 30% shrinkage at 250° F. The high shrinkage enables the high-shrinkage tapes 106 to shrink enough, when exposed to heat, to exert force against the lower periphery 122 of the load 102 (FIG. 5) sufficient to secure the protective cover 100 to the load 102.

Figure 9:
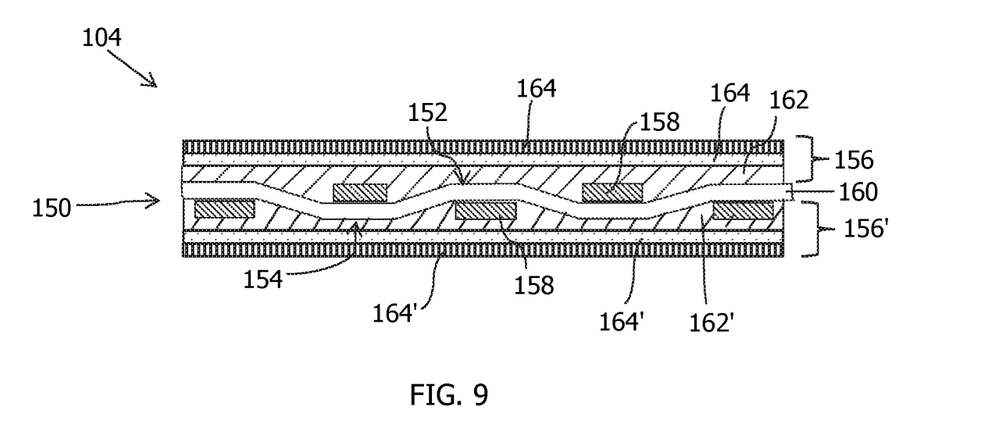
FIG. 9 is a cross-section of a third example of a coated woven material used to make the protective cover of FIG. 4.

Referring to FIG. 7, at least one coating 156 is applied to at least one of the first major surface 152 or the second major surface 154 of the woven scrim 150, and maybe applied to both the first and second major surfaces 152, 154. For most end-uses, it is preferred that the coating 156 be on both major surfaces 152, 154 of the woven scrim 150 (FIG. 9). The coating 156 forms a barrier against intrusion of the elements, including moisture, UV radiation, dirt, wind, and combinations thereof and may provide a printable surface for printing one or more indicia, such as a company name or advertisement, thereon.

The coating 156 includes poly-olefin materials, such as polyethylene, polypropylene, LDPE, LLDPE, EMA, EVA, other copolymers, or combinations thereof, and, optionally additives, such as pigments, colorants, antioxidants, UV stabilizers, anti-corrosion agents, flame retardant agents, slip agents, anti-block agents, printable additives, paper match additives, polar additives, or other additives. Referring to FIG. 7, the coating 156 can be a single-layer coating applied to the first major surface 152 of the woven scrim 150.

Figure 8:
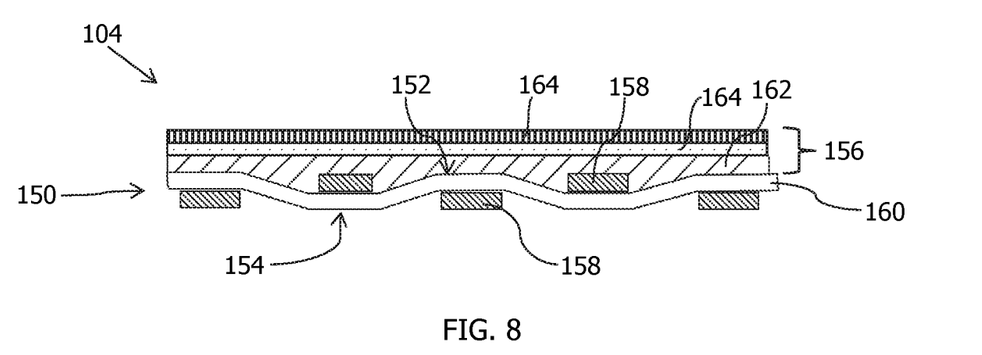
FIG. 8 is a cross-section of another example of a coated woven material used to make the protective cover of FIG. 4.

Referring to FIG. 8, the coating 156 can be a multi-layered coating 156 having a first coating layer 162 applied to the first major surface 152 of the scrim 150, and one or more secondary coating layers 164 applied to the first coating layer 162. Although FIG. 8 illustrates the coating 156 having 3 layers, it is understood that the multi-layer coating 156 can have two layers or more than three layers, such as four layers, five layers, or six layers, for example. Examples of coated woven materials 104 having multi-layer coatings 156 applied to first and/or second major surfaces 152, 154 of the woven scrim 150 are disclosed in co-pending U.S. application Ser. No. 15/165,692 (mentioned above), incorporated by reference above. In one embodiment of a woven coated material 104, an adhesive or tie layer (not shown) may be used between the coating 156 and the scrim 150, which may be applied by co-extruding the coating 156 and tie layer. Referring to FIG. 9, the coated woven material 104 has a coating 156, 156' applied, respectively, to both the first and the second major surfaces 152, 154 of the woven scrim 150. The coatings 156, 156' can be extrusion coated onto the scrim 150 and may be multi-layered coatings having a first coating layer 162, 162' and a second coating layer 164, 164'. Extrusion coating and other methods for applying coatings to a scrim are known in the art.

Figure 10:
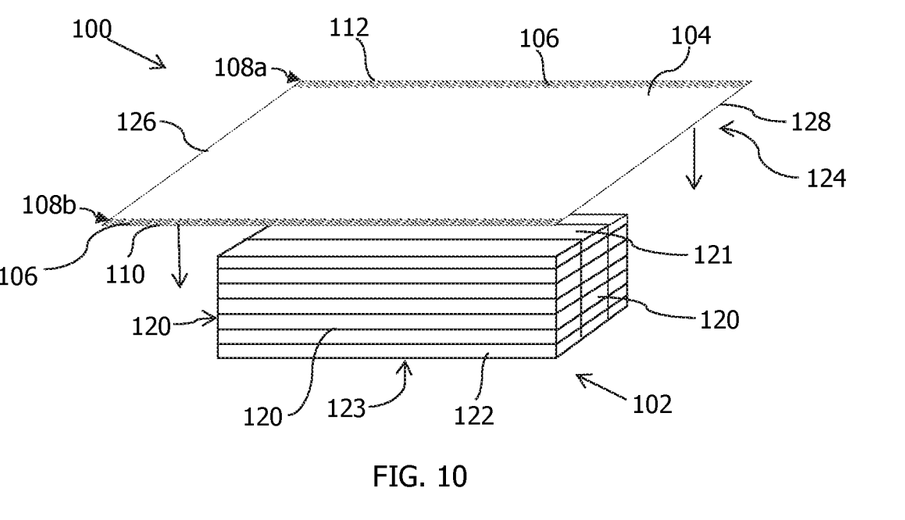
FIG. 10 is a perspective view of the protective cover of FIG. 5 prior to applying the protective cover to the load.
Figure 11:
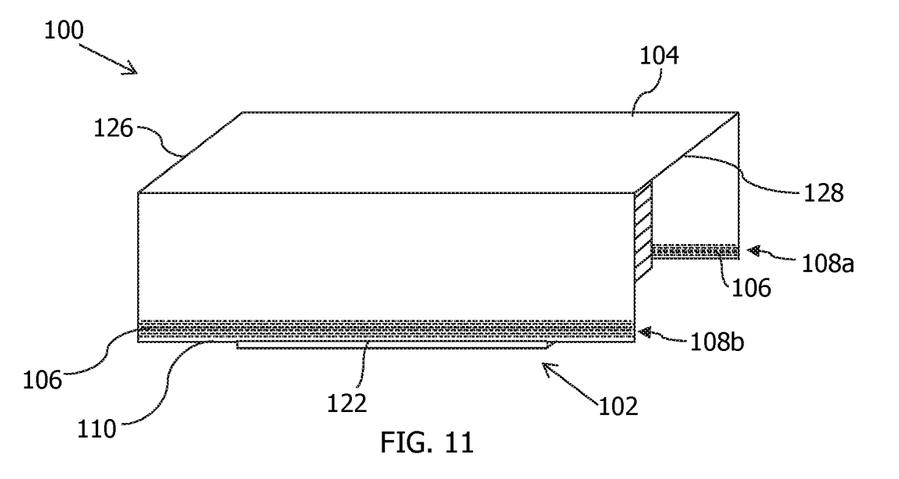
FIG. 11 is a perspective view of the protective cover of FIG. 10 partially positioned over the load.

Referring to FIGS. 10 and 11, the protective covering 100 can be a flat sheet 124 of the coated woven material 104 that can be draped over the load 102 so that the first and second edge bands 108a, 108b of high shrinkage warp tapes 106 are positioned along the lower periphery 122 of the load 102. FIG. 11 shows the protective covering 100 draped over the load 102 in an intermediate position prior to folding the first end 126 and the second end 128 as illustrated in FIG. 5, such that a first end 126 and a second end 128 of the flat sheet 124 are folded down against the load 102 and secured to the load or the protective cover itself by welding, stitching, heat sealing, adhering, stapling, or otherwise securing any folded-over portions to the load. The first and second ends 126, 128 are generally transverse to the machine direction 114 and extend perpendicularly from the first edge 110 to the second edge 112 of the coated woven material 104. The first and second ends 126, 128 of the flat sheet 124 may be manually or automatically folded and secured to the load 102. The flat sheet 124 may be oriented to place the first end 126 and the second end 128 along the long sides 132 or the short sides 134 of the load 102, but typically the short sides as shown in the figures. The protective covering 100 covers the four sides 120 and the top 121 of the load 102 but does not generally extend to cover the bottom 123 of the load. Heat is applied to the high shrinkage warp tapes 106 to cause the high shrinkage warp tapes 106 to shrink against the lower outer periphery 122 of the load 102, exerting a force against the load 102 to secure the protective covering 100 to the load 102.

Referring back to FIG. 5, staples 146 may be used to secure the first and second ends 126, 128 of the flat sheet 124 against the load 102, but only a small number of staples 146 are needed to secure the ends 126, 128 from unfolding, in contrast to the numerous staples used in the prior art method illustrated in FIG. 2. Because the high shrinkage warp tapes 106 secure the protective covering 100 to the load 102, staples 146 are not needed along the lower periphery 122 of the load 102 to secure the protective covering 100 to the load 102. Other methods of securing the first and second ends 126, 128 may be used to completely eliminate the need for staples 146 and the concerns therewith.

Figure 12:
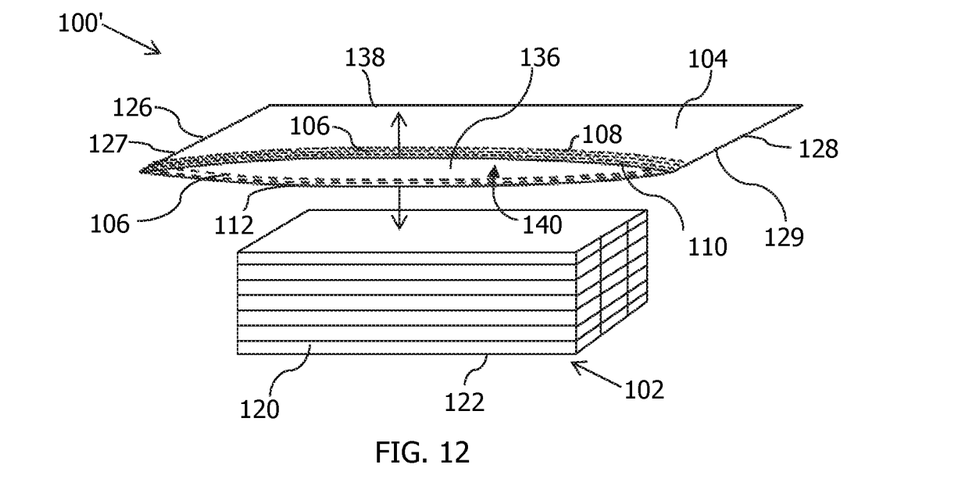
FIG. 12 is a perspective view of another example of a protective cover.

Referring to FIG. 12, a protective covering 100' can be made by forming a flat sheet of coated woven material 104 into an envelope 136 capable of receiving the load 102. The envelope 136 may be made by folding a flat sheet (FIG. 4) of the coated woven material 104 in half along a centerline 138 that is parallel to the machine direction 114 of the coated woven material 104 and welding, stitching, heat sealing, adhering, stapling, or otherwise securing the first ends 126 together into a first seam 127 and the second ends 128 together into a second seam 129 to form the envelope 136. The envelope 136 is characterized by an opening 140 between the first edge 110 and the second edge 112 of the coated woven material 104. The protective coverings 100 may be manufactured as a continuous web of envelopes 136 separated by one or more score lines or perforations (not shown) to facilitate separating each individual protective covering 100 from each adjacent protective covering (not shown).

Figure 13:
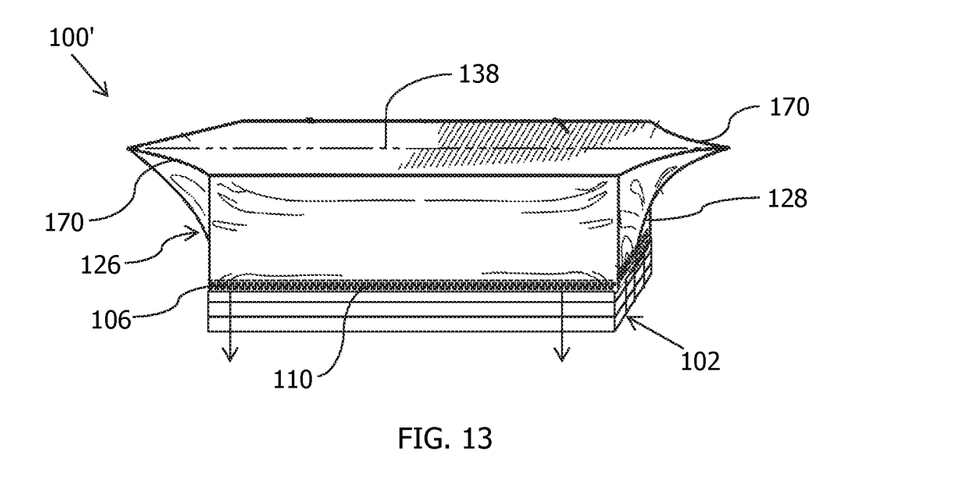
FIG. 13 is a perspective view of the protective cover of FIG. 12 partially applied to a load.
Figure 14:
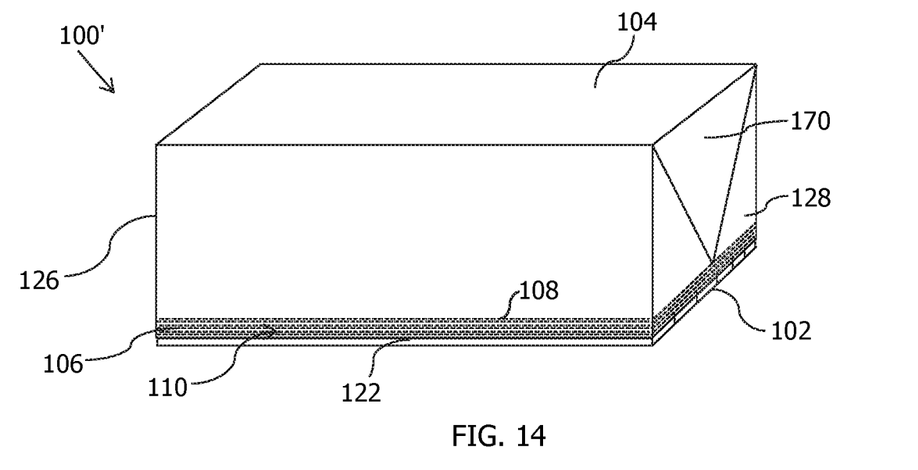
FIG. 14 is a perspective view of the protective cover of FIG. 12 fully applied to the load.

The protective covering 100' may be dispensed from a roll or a stack of protective coverings 100', and the first edge 110 and the second edge 112 thereof are moved away from each other to open the envelope 136, and the first and second edges 110, 112 are guided down over the sides 120 of the load 102 as shown in FIG. 13. Referring to FIG. 13, sliding the envelope 136 over the load 102 results in triangular projections 170 extending outwardly from opposite ends 126, 128 of the protective covering 100'. Referring to FIG. 14, the triangular projections 170 can be folded down and secured to the ends of the load 102 by welding, stitching, heat sealing, adhering, or stapling the triangular projections 170 to the protective cover 100' or the load 102. When the load 102 is fully received within the envelope 136 of the protective covering 100', the plurality of high-shrinkage warp tapes 106 defining the edge band 108 are positioned along the lower periphery 122 of the load 102. Heat is applied to the high-shrinkage warp tapes 106, causing the high-shrinkage warp tapes 106 to decrease in size to shrink against the sides 120 of the load 102, thereby securing the protective covering 100' to the load 102.

Figure 15:
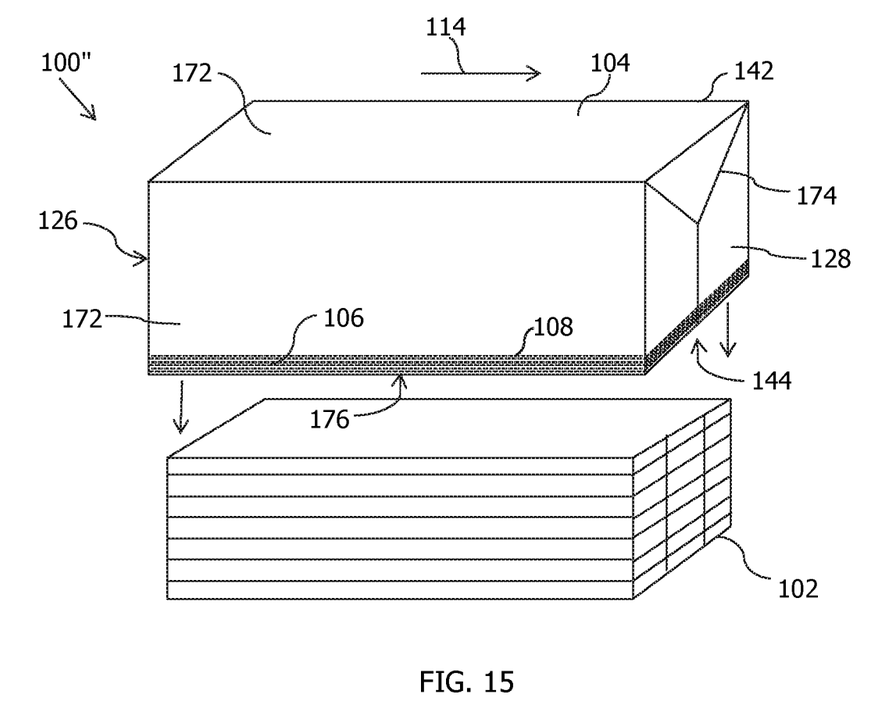
FIG. 15 is a perspective view of yet another embodiment of a protective cover.

Referring to FIG. 15, the protective covering 100" can be a multi-sided bag 142 having an open side 144 for receiving the load 102 therein. The multi-sided bag 142 and the open side 144 together define a cavity 176 having a three-dimensional shape that generally conforms to a shape of the load 102 to be protected. In one aspect, protective covering 100" is a five-sided bag 142, and the cavity 176 defined by the five-sided bag 142 can be a rectangular cuboid, which can be useful for the five-sided bag 142 to receive a rectangular load 102, such as a stack of lumber, for example. Although a protective cover 100" is described and illustrated as defining a cavity 176 that has a rectangular cuboid shape, it is understood that the coated woven material 104 can be formed into other geometric or irregular three-dimensional shapes.

The five-sided bag 142 can be formed by folding a flat sheet of coated woven material 104 into the three-dimensional shape and securing each of the first and second ends 126, 128 to form the cavity 176. More particularly, the flat sheet can be folded—in the machine direction 114—into three sections 172 parallel to the machine direction 114. The three sections 172 define the top and two opposing sides of the cuboidal shaped cavity 176. In one aspect, the first end 126 is folded inward to form a third side of the cuboidal shaped cavity 176 and secured in place by welding, stitching, adhering, heat-sealing, stapling (together, not to the load), or otherwise securing. The second end 128 is also folded inward to form a fourth side of the cuboidal shaped cavity 176 and secured in place by welding, stitching, adhering, heat-sealing, stapling (together, not to the load), or otherwise securing. Each of the first and second ends 126, 128 can be secured along one or more seams 174. In another aspect, a rectangular flat sheet 124 can be trimmed or cut into a blank (not shown), which can then be folded into the five-sided bag 142 and the ends 126, 128 secured.

Figure 16:
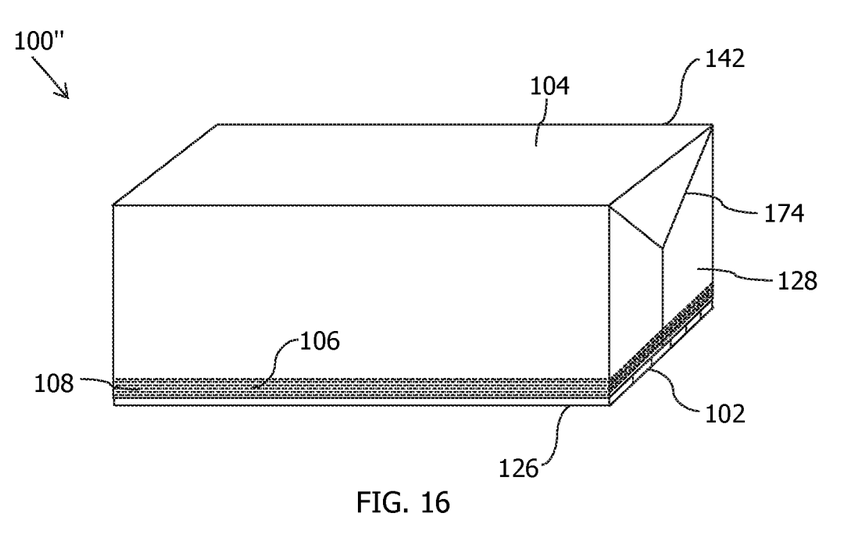
FIG. 16 is a perspective view of the protective cover of FIG. 15 applied to a load.

Referring to FIGS. 15 and 16, the five-sided bag 142 can be positioned over the load 102 and pulled down over the load 102 so that the load 102 is fully received in the cavity 176. With the load 102 fully received in the cavity 176, the plurality of high-shrinkage warp tapes 106 are positioned along the lower periphery 122 of the load 102. Heat can then be applied to the high shrinkage warp tapes 106 to cause the high shrinkage warp tapes 106 to decrease in length and shrink against the lower periphery 122 of the load 102, thereby securing the five-sided bag 142 to the load 102.

A method for protecting a load 102 for shipment includes providing a protective covering 100, 100', 100", such as those described herein having a plurality of high-shrinkage warp tapes 106 woven into the first and second edges 110, 112 of a woven coated material 104 (as shown in FIG. 4), positioning the protective covering 100, 100', 100" over the load 102 so that the plurality of high-shrinkage warp tapes 106 are positioned around a lower periphery 122 of the load 102, and applying heat to the plurality of high-shrinkage warp tapes 106 to cause the high-shrinkage warp tapes 106 to shrink around the load 102 to secure the protective covering 100, 100', 100" to the load 102. In one aspect, the protective covering 100 can be a flat sheet of coated woven material 104, and the positioning step can include draping the flat sheet over the load 102, folding the first end 126 and second end 128 inward against the sides 120 of the load 102, and securing the first end 126 and second end 128 from unfolding. The first and second ends 126, 128 can be secured to the load 102 or to another portion of the protective covering 100. Securing can be accomplished by welding, stitching, adhering, heat-sealing, stapling, other securing methods, or combinations thereof. In one aspect, the method can include forming a flat sheet 124 of coated woven material 104 into an envelope 136 or a multi-sided bag 142. In another aspect, providing a protective covering 100, 100', 100" can include providing a protective covering 100', 100" that is pre-formed into an envelope 136 or a multi-sided bag 142.

The protective coverings 100, 100', 100" disclosed herein are capable of withstanding wind-whip and abrasions, which often lead to tears, experienced during transport of the load because the coated woven material 104 is stronger and more robust than other shrink wrap materials. The protective coverings 100, 100', 100" remain secured to the load without the need for a plurality of staples and, thus, eliminates the safety hazard of using staples and minimizes the time costs of inefficiently stapling the cover to the load. The protective coverings 100, 100', 100" also prevent the problems with saws caused by staples left embedded in the wood.

Although the invention is shown and described with respect to certain embodiments, it is obvious that modifications will occur to those skilled in the art upon reading and understanding the specification, and the present invention includes all such modifications.

What is claimed is:

1. A protective covering comprising:
    a woven scrim comprising:
        a first edge parallel with a warp direction and a second edge opposite the first edge;
        a first edge band proximate the first edge and a second edge band proximate the second edge; each of the first edge band and the second edge band comprising a plurality of weft tapes and a plurality of high-shrinkage warp tapes; wherein each of the first edge band and the second edge band has a width, said each width being juxtaposed to the first edge and the second edge, respectively;
        a continuous central portion of greater width than that of the first and the second edge bands, the continuous central portion positioned in between the first and the second edge bands, the continuous central portion comprising a plurality of non high-shrinkage warp tape and non high-shrinkage weft tape, so that the continuous central portion has a shrinkage that is less than a shrinkage of the first and the second edge band such that the first and the second edge bands are configured for constriction about a load upon application of heat; and
    a coating on at least one major surface of the woven scrim.

2. The protective covering of claim 1, wherein the width, measured transverse to the machine direction, is about 1 in to about 8 in.

3. The protective covering of claim 1, wherein the protective covering is a flat sheet of the coated woven material.

4. The protective covering of claim 3, wherein a first end and a second end of the flat sheet of the coated woven material are configured to form an envelope for receiving a load therein.

5. The protective covering of claim 1, wherein the plurality of weft tapes are low-shrinkage tapes.

6. The protective covering of claim 1, wherein the shrinkage of the warp tapes positioned in between the first and second edge bands is greater than a shrinkage of the plurality of weft tapes.

7. The protective covering of claim 1, wherein the plurality of high-shrinkage warp tapes are oriented tapes subjected to minimal or no annealing during the orienting process in order to provide high shrinkage.

8. The protective covering of claim 1, wherein the high-shrinkage warp tapes comprise polypropylene.

9. The protective covering of claim 1, wherein the coated woven material is in the form of a multi-sided bag.

10. A protective covering comprising:
    a woven scrim comprising:
        a first edge parallel with a warp direction and a second edge opposite the first edge;
        a first edge band proximate the first edge and a second edge band proximate the second edge; each of the first edge band and the second edge band comprising a plurality of weft tapes and a plurality of high-shrinkage warp tapes;
        a continuous central portion in-between the first and the second edge bands, the continuous central portion comprising a plurality of non high-shrinkage warp tape and non high-shrinkage weft tape, so that the continuous central portion has a shrinkage that is less than a shrinkage of the first and the second edge bands such that the first and the second edge bands are configured for constriction about an object upon application of heat; and
    a coating on at least one major surface of the woven scrim;
    wherein the protective covering is configured as an envelope for receiving a load therein, wherein the shrinkable edge bands define an opening with a continuous non-shrinkable portion therebetween.

11. A protective covering comprising:
a woven scrim configured for wrapping objects, the woven scrim comprising:
- a first edge parallel with a warp direction and a second edge opposite the first edge;
- a first edge band proximate the first edge and a second edge band proximate the second edge; each of the first edge band and the second edge band comprising a plurality of weft tapes and a plurality of high-shrinkage warp tapes;
- a continuous central portion in-between the first and the second edge bands, the continuous central portion comprising a plurality of non high-shrinkage warp tape and non high-shrinkage weft tape, so that the continuous central portion has a shrinkage that is less than a shrinkage of the first and the second edge bands upon application of heat; and a barrier coating of one or more layers, the barrier coating on at least one major surface of the woven scrim,
wherein the protective covering is configured as an five-sided bag for receiving a load therein, wherein the shrinkable edge bands define an opening with a continuous non-shrinkable portion therebetween.

* * * * *